(12) United States Patent
Nummelin et al.

(10) Patent No.: US 7,996,845 B2
(45) Date of Patent: Aug. 9, 2011

(54) METHODS AND APPARATUS TO CONTROL APPLICATION EXECUTION RESOURCE WITH A VARIABLE DELAY

(75) Inventors: Jussi Nummelin, Tampere (FI); Lasse Lindell, Helsinki (FI)

(73) Assignee: Nokia Corporation, Espoo (FI)

( * ) Notice: Subject to any disclaimer, the term of this patent is extended or adjusted under 35 U.S.C. 154(b) by 1303 days.

(21) Appl. No.: 11/600,269

(22) Filed: Nov. 14, 2006

(65) Prior Publication Data
US 2008/0222641 A1   Sep. 11, 2008

(51) Int. Cl.
*G06F 9/46* (2006.01)
(52) U.S. Cl. ....................................... 718/104
(58) Field of Classification Search .................. None
See application file for complete search history.

(56) References Cited

U.S. PATENT DOCUMENTS 6,424,993 B1 * 7/2002 Weber ........................... 709/203
6,848,106 B1 * 1/2005 Hipp ............................. 719/312

FOREIGN PATENT DOCUMENTS

GB          2372349 A        8/2002
WO       WO-00/74338 A2    12/2000

OTHER PUBLICATIONS

"Avoiding Deadlock in a Message-Passing Control Program", IBM Technical Disclosure Bulletin, IBM Corp. New York, vol. 28, No. 5, Oct. 1, 1985, pp. 1941-1942, XP002298637.
Isovic, D. et al., "Handling Sporadic Tasks in Off-line Scheduled Distributed Real-Time Systems", Real-Time Systems, [online], Jun. 9, 1999, pp. 60-67, XP-002465355, Retrieved from the Internet.

* cited by examiner

*Primary Examiner* — Meng An
*Assistant Examiner* — Mengyao Zhe
(74) *Attorney, Agent, or Firm* — Harrington & Smith

(57) ABSTRACT

An application executing apparatus including at least one execution resource configured to execute at least one application is disclosed. The apparatus is provided with at least one processor configured to detect events triggering execution of the at least one application and to dynamically control use of the at least one execution resource in handling of the detected events based on a variable reflective of the operating conditions of the apparatus.

21 Claims, 7 Drawing Sheets

METHODS AND APPARATUS TO CONTROL APPLICATION EXECUTION RESOURCE WITH A VARIABLE DELAY

BACKGROUND OF THE INVENTION

1. Field of the Invention

The present invention relates to execution of applications provided in a communication system, and in particular, but not exclusively, to apparatus such as application servers handling execution of applications.

2. Description of Related Art

Various applications may be provided for a user provided with appropriate user device for communication via a communication system. A communication system is a facility which enables communication between two or more entities such as user terminal devices or other communication devices, network entities such as servers and other nodes. A communication system is typically adapted to operate in accordance with at least one communication protocol.

The applications are provided by data processing apparatuses such as application servers connected to the communication system and configured for execution of at least one appropriate software code. The applications may be any appropriate applications that may be provided via a communication system. Non-limiting examples of the applications include applications enabling communication of voice or video, electronic mail (email) applications, data downloading applications, multimedia applications and so on.

Typically an application is provided by a data processing device such as an application server provided with appropriate hardware for execution of an appropriate application software. The application may be executed in response to any appropriate event. In accordance with a non-limiting example an application is executed in response to a request for the application. For example, a user may request for a voice call or a video download from an application server where after the server responds the request by providing the requested application.

Data processing devices such as application servers typically handle vast amounts of events. Due to the lack of any human intervention the data processing devices execute the applications and respond events triggering an execution, in most instances in a quick and predictable manner. The handling of an event such as a request for an application is typically split into stages. For example, an application server may handle a message requesting for an application such that it first reads header information in the message and deals with other issues relating to the protocol used for the communication. Thereafter the server can process the actual message part, i.e. the payload that may need to be handled by the application.

The latter stages of handling typically comprise attaching the payload with an appropriate worker thread. After this the thread can enter an application/service providing function of the server, for example a function known as the "execution pipeline" of the server. The application providing function provides the resources for the actual execution of the application code and thus provides the requestor with the application.

Application servers may need to be capable of handling a great amount of requests and other events. A performance criteria most commonly applied to the application servers is the throughput. Throughput, however, is often not too problematic in high performance applications such as telecom-grade applications, in particular since the throughput is relatively easy to benchmark and regulate. The term telecom-grade application is commonly understood to refer to an application provided in a telecommunication system where higher performance in terms of throughput and latency may be demanded than what is commonly acceptable in the traditional information technology and/or so called web service applications. For example, a telecommunication operator may require that almost all requests are handled in a set time limit whereas the similar requirement in providing web services or similar may be lower. For example, an adequate cluster and a smart load-balancer can solve most of the possible throughput problems in nodes of a telecommunication system.

However, the situation is different if the traffic is burst in nature. Although the load-balancers and clustering may also be used in handling traffic bursts and related problems, through regulating the load of a single application server, they may not offer a proper working model to tackle bursts.

Also, although the throughput is generally accepted as the measure of performance, other factors such as the response time may also be important from the point of view of efficient operation. This may be in particular the case in telecom-grade applications where there typically are tight, typically operator specific, limits for maximum latencies in responses. Many of the less sophisticated systems may thus be forced to run in relatively low loads to ensure that no peak in the traffic or no internal event, for example a garbage collector in a Java virtual machine (VM), can delay a single request too much.

A way to solve latency issues is to increase the maximum throughput of an application server relative to the normal or average load. The thinking behind this is that if the load is kept below a certain level, then the extra capacity of the server should be able of handling each message within the set time limits. A result, however, is that the maximum throughput is increased to unnecessarily high levels. While this may provide a working model for most of the applications, the increase in the throughput capacity may also lead in excessive and possibly very costly hardware that is underused most if not all of the time.

The response time is becoming an increasingly important factor due to the increasing amount of time critical applications. In a time critical application a user, a network element or another requesting entity may expect that an application is executed without any unnecessary delays. Non-limiting examples of time critical applications include video streaming and packet switched voice calls.

Various models have been proposed for handling incoming messages in time critical applications. In a periodic handling of request and other events a fixed interval is determined for the handling of an event. The periodic model is relatively deterministic in its nature because the rate of execution is regulated by the period. However, the periodic model does not always fit perfectly into all applications, for example because the events may be created by different users who are using different terminals. The events can therefore be very asynchronous by their nature. Also, the length of the period has often to be set based on the worst case scenario, increasing the length thereof. This, in turn, may introduce extra delays and waste of resources.

Asynchronous handling is another way of handling incoming messages. Usually asynchronous message handler does some fast processing and then handles the message forward to a "worker thread". The worker threads then generally dictate the behaviour of the asynchronous handling. A simple way is just to start a new thread for each received message. However, the asynchronous model does not always behave satisfactorily in bursts. For example, in a sudden burst the system may get very busy in creating and/or starting threads. Most of those threads will then wait for a critical system resource to become available. In a bad case scenario the first thread will be run as the last one of the threads in a burst. Individual messages can thus get huge latencies even when the average response time may appear to be satisfactory.

Thread pools have been introduced to prevent thread creation delay. In a burst a thread pool may, however, run out of threads and messages will have to wait until reserved threads are freed up. Thus, even with the thread pools the first message of a burst may end up waiting while the whole thread pool is emptied. Also, in a burst, a simple thread pool and asynchronous handler may give system a sudden leap from a situation where almost no threads are in use to a situation where all threads are in use.

Sporadic handling is yet another model that has been proposed for handling of messages received at an application server. The sporadic handling is named after the behaviour of spores of a plant. The sporadic handling is based on use of a predefined minimum delay that is always waited after processing of each of the messages before processing a next message. When compared to the asynchronous handling, the sporadic handling has an advantage of giving each message a little more time to execute before the handling of next message is to begin. Combined with thread pools this is believed to behave and perform better, than a handler that is based on asynchronous handling.

A downside of the sporadic handling is that the fixed delay is not always needed. Thus, when that fixed delay would not be needed it will only introduce unnecessary latency into the message handling. Also, in some applications and occasions the fixed delay may not even be set to be long enough. For example, two or more messages may arrive at the same time and the first one handled may become blocked by an input/output (I/O) operation right in the beginning. The other messages will then have to wait the sporadic delay even though the system itself could well execute it while waiting for the I/O operation to complete.

SUMMARY

The embodiments aim to address one of more of the above issues.

In accordance with an embodiment there is provided an application executing apparatus comprising at least one execution resource configured to execute at least one application. The apparatus is also provided with at least one processor configured to detect events triggering execution of the at least one application and to dynamically control use of the at least one execution resource in handling of the detected events based on a variable reflective of the operating conditions of the apparatus.

In accordance with another embodiment there is provided a method for controlling execution of applications in an apparatus. In the method execution of an application is triggered in response to an event. Use of execution resources in handling of the event is dynamically controlled based on a variable reflective of the operating conditions of the apparatus.

A yet another embodiment provides a computer program embodied on a computer-readable medium, the computer program configured to provide a method wherein use of execution resources in handling of events is dynamically controlled in an apparatus for executing applications based on a variable reflective of the operating conditions of the apparatus.

In a more specific embodiment the variable may comprise a variable delay. Overloading of the apparatus may be prevented by increasing the delay.

The value of the variable may be determined based on at least one of information about reserved resources, information obtained by polling low priority threads and information of desired system parameters.

The apparatus may transfer between different modes of operation in response to change in the value of the variable. For example, the apparatus may operate in an asynchronous mode or in a sporadic mode depending on the value of the variable.

BRIEF DESCRIPTIONS OF THE DRAWINGS

For a better understanding of the present invention and how the same may be carried out, reference will now be made by way of example only to the accompanying drawings in which.

DESCRIPTION OF EXEMPLYFYING EMBODIMENTS

Figure 1:
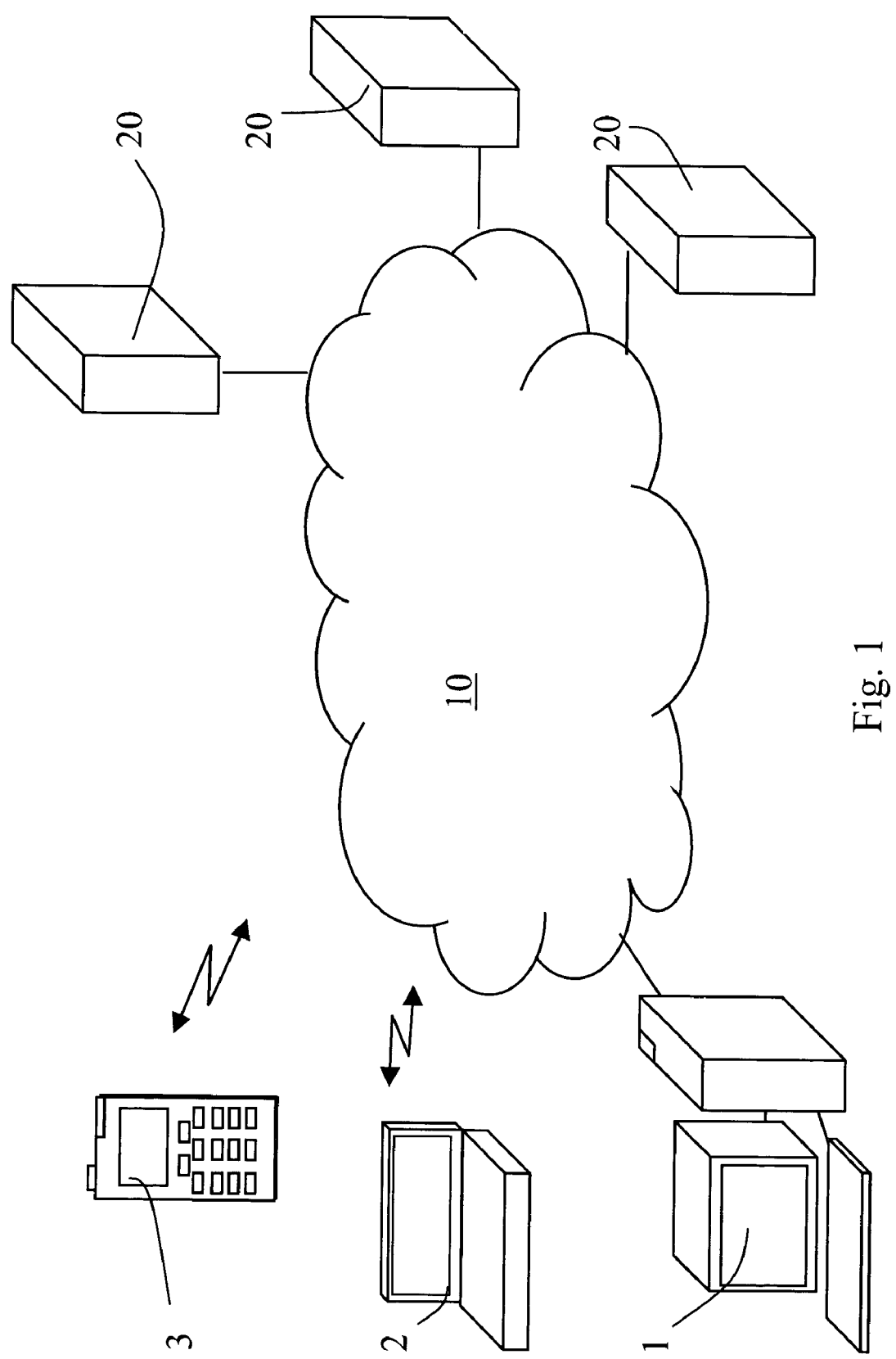
FIG. 1 shows a schematic presentation of an exemplifying communication system wherein users may access applications provided by application servers.

Before explaining in detail certain exemplifying embodiments, certain general principles of providing service applications by data processing apparatus connected to a communication system are briefly explained with reference to FIG. 1 showing a schematic presentation of a communication system.

Various services and/or applications can be provided by data processing apparatuses 20 via a communications system 10. The communication system may be adapted for packet switched and/or circuit switched communication. The communication system may comprise one or more communication networks. For example, the user may be connected to a mobile or fixed line telecommunication network which is connected via suitable gateway arrangement to a data network, for example to an Internet Protocol (IP) network. The user may also be connected to the data network via a local area network.

A user can use an appropriate user device 1, 2 or 3 for accessing the services. The user devices may be provided with a wireless access interface or a fixed access interface by means of an appropriate access system. For example, a mobile user 2 or 3 can access wirelessly the communication system via at least one base station or similar wireless transmitter and/or receiver node.

Generally speaking, the user devices 1 to 3 can be used for various tasks such as making and receiving phone calls, for receiving and sending data from and to a data network and for experiencing, for example, multimedia or other content. An appropriate user device can be provided by any device capable of at least sending and/or receiving signals. The user device is also typically provided with at least one data processor and at least one memory. Non-limiting examples include a mobile station (MS), a portable computer provided with a wireless interface card or other wireless interface facility, personal data assistant (PDA) provided with wireless communication capabilities, a desktop personal computer or any combinations of these or the like.

Figure 2:
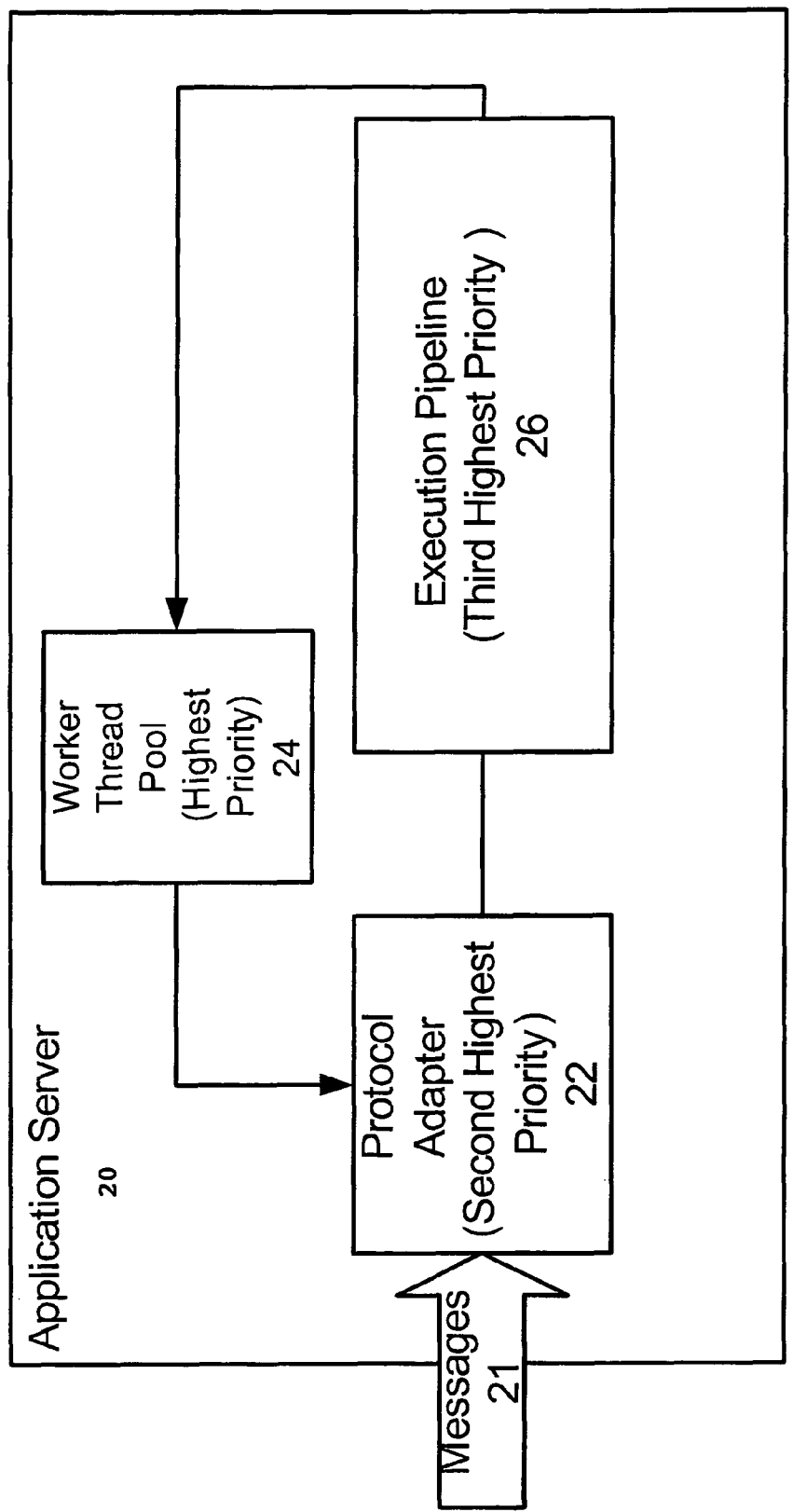
FIG. 2 shows an exemplifying diagram of application execution framework of an application server.

FIG. 2 shows an abstract view of a possible application execution framework of a data processing apparatus. The data processing apparatus is configured to provide application execution resources that can be executed in response to an event. In the examples given below the event consist of a message requesting for a service application. It is noted that although the exemplifying application server is explained below with reference to Java™ it is clear that similar functions may be provided based on any appropriate programming technology.

More particularly, FIG. 2 is a view of the execution framework of a time critical application server 20. In FIG. 2 a protocol adapter 22 handles messages 21 it receives by requesting a new worker thread from a thread pool 24. The thread pool 24 can be provided by a relatively simple function. A thread pool function may thus have only a relatively small code to execute. The code is typically mainly related to handling threads in the pool. A worker thread is then set to run in an "execution pipeline" 26. In other words, the protocol adapter 22 may request for a new thread from the thread pool 24 and then release the thread to be run in the execution pipeline 26.

It is noted that the execution pipeline is only a term used for the functionality of executing worker threads and that in reality there may not be any particular module or software component called an "execution pipeline". The block 26 can thus be understood to form a logical entity which comprises the applications run on the application server. It is also noted that in addition to or instead of the protocol adapter any other function can "set" a thread to run in an execution pipeline. Use of the protocol adapter for this purpose may be advantageous in some application since typically the protocol adapter triggers the entire event of worker thread starting to run. The threading itself may be hidden within the system. Also, the priorities of threads and messages may also be hidden, for example, from the designers of the system. A designer may only be provided something which is known as a "perfect concurrency".

In FIG. 2 the assumed priority order of components is such that a scheduler runs the highest priority thread ready to run. The scheduler may be provided somewhere in an execution environment where the application server code is run. The protocol adapter 22 is assumed to have a higher priority than the execution pipeline 26. This means that any incoming message interrupts all processing going on in the execution pipeline until the protocol adapter has got a new worker thread for it. It is noted, though, that although priorities are explained herein, they are not necessary in all applications. In particular, there are applications where it is better to avoid use of priorities due to the certain disadvantages of priority orders as any such order may have a negative effect on the operation of the lower order entities. Different time slicing schemes may be used to address these issues, but they also make behaviour of time critical systems much more difficult to predict.

For example, in a time critical Java™ coding implementation typical Java™ 2 Enterprise Edition (J2EE)—like technologies may be discarded, and a lighter solution may be provided. An adaptive burst protection implementation may be provided by introducing a delay in the request of a new worker thread. This may be provided with a simple blocking method call. In this context the blocking means that a thread calling the function waits until the function call is completed. Thus the function can dictate how long the calling thread will be waiting. While thread is blocked system has opportunity to execute other threads.

It is noted that the block diagram of FIG. 2 is only an abstract view and that functions shown therein may be provided by any appropriate components and combinations thereof and that there are various mechanism and technologies that can be employed in a real life implementation. In accordance with a non-limiting example, messages may be communicated based on a Java™ Message Service (JMS) application protocol interface (API) standard allowing application components based on the Java™ 2 Platform, Enterprise Edition (J2EE) to create, send, receive, and read messages. An advantage of this mechanism is that it enables distributed communication that is loosely coupled, reliable, and asynchronous. The protocol adapter may be provided based on a J2EE Connector architecture (JSA). This provides a Java™ technology solution for connecting between the plurality of application servers and enterprise information systems (EIS). The execution pipeline may be provided by a set of MessageDrivenBeans and JavaBeans. The Enterprise JavaBeans (EJB) technology is a server-side component architecture for Java™ Platform, Enterprise Edition (Java EE). EJB technology enables a rapid and simplified development of distributed, transactional, secure and portable applications based on Java™ technology. MessageDrivenBean (MDB) is an asynchronous EJB activated by message delivery.

Figure 3:
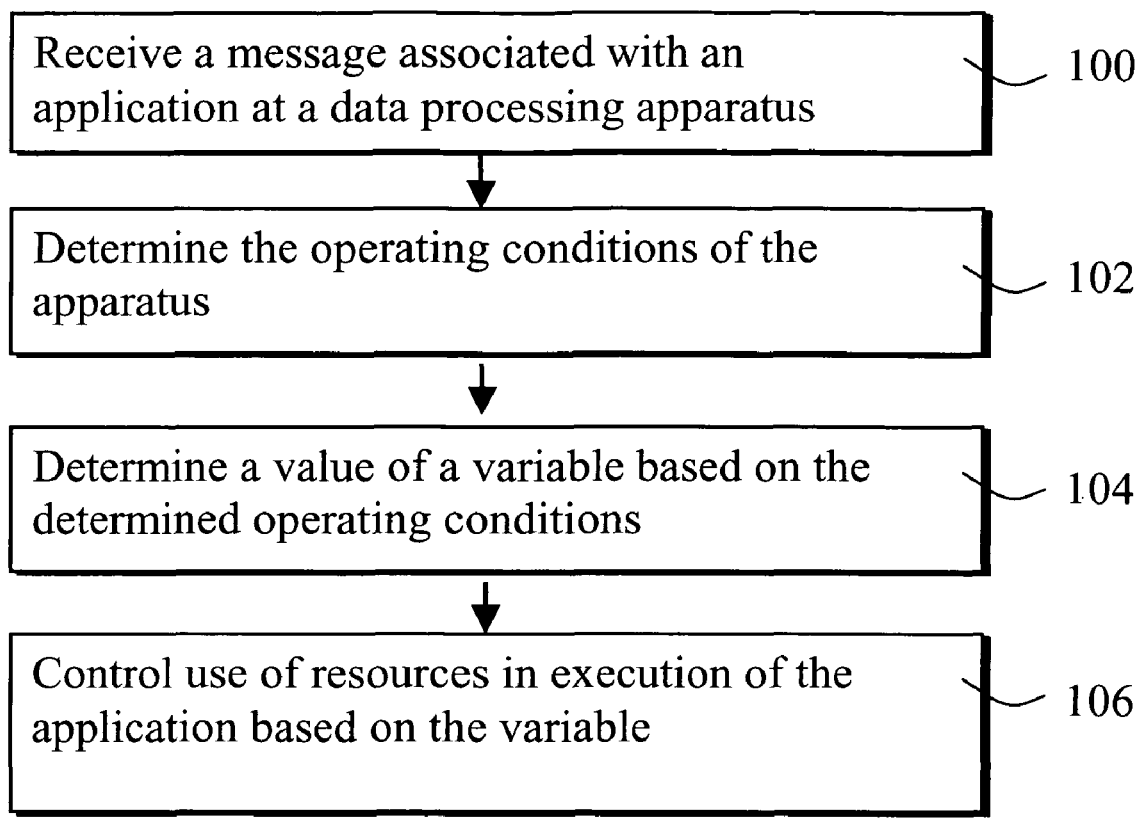
FIG. 3 is a flowchart in accordance with an embodiment.

A reference is now also made to the flowchart of FIG. 3 illustrating operation in accordance with an embodiment wherein burst protection is provided for at least one event driven application server. More particularly, FIG. 3 shows an operation where an event triggering the execution of resources comprises a message requesting for an application. A data processing apparatus receives the message at 100. The message may be based on any appropriate message, a non-limiting example being a Session Initiation Protocol (SIP) request. The operating conditions of the apparatus may then be determined at 102. For example, the apparatus may determine the loading condition thereof and decide based on this if the message can be handled and responded immediately or if another approach is required to maintain the overall latency of the apparatus in acceptable levels.

The data processing apparatus can be operated between a pure asynchronous mode and a pure sporadic handling mode based on a variable. This enables dynamic control of the use of execution resources for handling of the received messages based on a variable reflective of the operating conditions of the apparatus. A value of such variable is thus determined at 104. The value reflects the operating conditions experienced by the data processing apparatus. Execution of the application is then controlled based on the variable at 106.

The variable may comprise a variable delay. The value of the variable may be based on information about the already reserved resources. For example, the value of the variable may be determined based on information of sporadic threads that are already in use. Other examples of possibilities for determining the value of the variable are explained later in this specification.

The load determination may be performed at various stages. In addition of determining the load when a message is received and a new thread is requested, the determination may be done for example periodically so that when a message comes in the mode is already selected. This is an application specific issue that depends on various factors such as what is used as a load measurement.

In a relatively simple case, if the load measurement can be provided based on the number of threads in use, then the determination may be provided by a short formula calculated with one variable stored in thread pool. This may be provided each time a thread is requested. A thread pool may for example upkeep a variable based on events of giving or getting a thread.

For example, if the delay is

"$f(x)=t*1\ ms$"

where t is number of threads in use,
no additional determination may be needed. Instead, a simple wait-command with variable t as parameter can be used. When no threads are in use then t=0 and the system will function asynchronously. With each thread taken in use the wait period will increase and the system becomes sporadic in nature.

A more complex logic may be provided. For example, a background determination may be provided and the variable may be updated once per second or other short interval. There may even be provided a special function for collecting thread data from the system, for calculating load information and for updating a state variable data that may then be used immediately when requesting a new worker thread.

The following discusses in greater detail some particular examples where a simple variable sporadic rate is used for handling of messages in application servers experiencing substantial variations in the traffic load. For example, in a server provided with four central processing units (CPUs) it might be advantageous to handle, for example, three messages right away, one for each CPU, assuming one CPU handles management, and then slowly to increase the wait time for each message to prevent the system from getting flooded.

The system may only need to keep track of used resources for the determination of the variable. For example, the system may keep track on how many threads are in use in a given moment, and to introduce a delay into the processing that is calculated from that information. The algorithms and formulas for the determination of the variable delay parameter can be kept relatively simple, for example 1 ms wait per thread in use.

Figure 4:
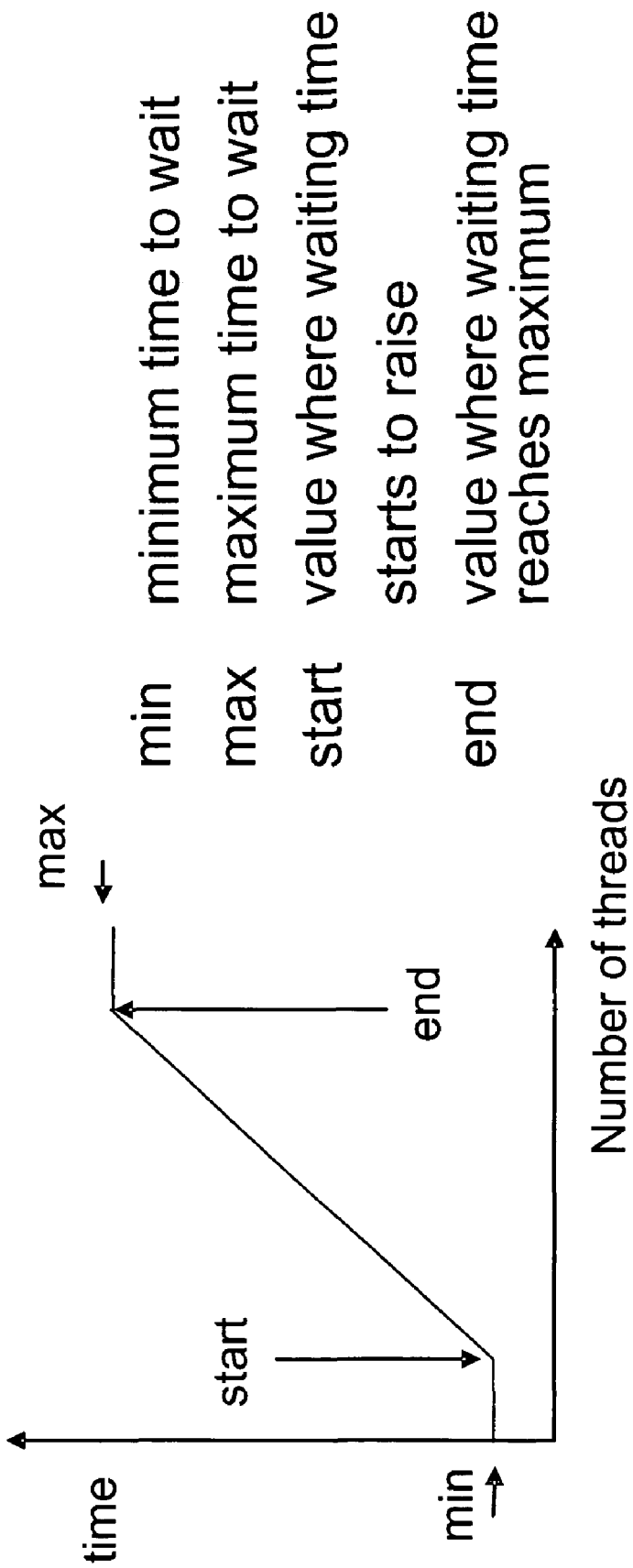
FIG. 4 shows a diagram for an exemplifying variable in accordance with an embodiment.

The introduced delay may depend from a set of parameters. FIG. 4 shows an example of a simple linear parametrical delay related to the number of threads in use. It is noticeable that with a function f(x)=0 the behaviour of the data processing apparatus is purely asynchronous. With any constant function f(x)=c the behaviour of the data processing apparatus becomes sporadic.

The above described embodiment can be further clarified by the following example of dynamic combining of asynchronous and sporadic handling. If it is assumed that an event occurs at a time x relative to a previous event and that the asynchronous handling of the event occurs immediately, the function F(x) giving the time when the handling starts can be written:

$F(x)=x$

Sporadic handling can be provided in a similar manner than the asynchronous handling but with a minimum interval between the events. If the interval is c, then function would be:

$F(x)=c|x \leq c$ $F(x)=x|x>c$

When c=0, the handling mechanism no longer operates in a purely sporadic handling mode but operates as an asynchronous handling mechanism.

In the embodiments different system resource metrics can be used to increase the interval c from 0 to x. Thus the behaviour of the system changes from asynchronous to sporadic in a dynamic fashion in reflection to the changing operational conditions in the system.

Figure 5:
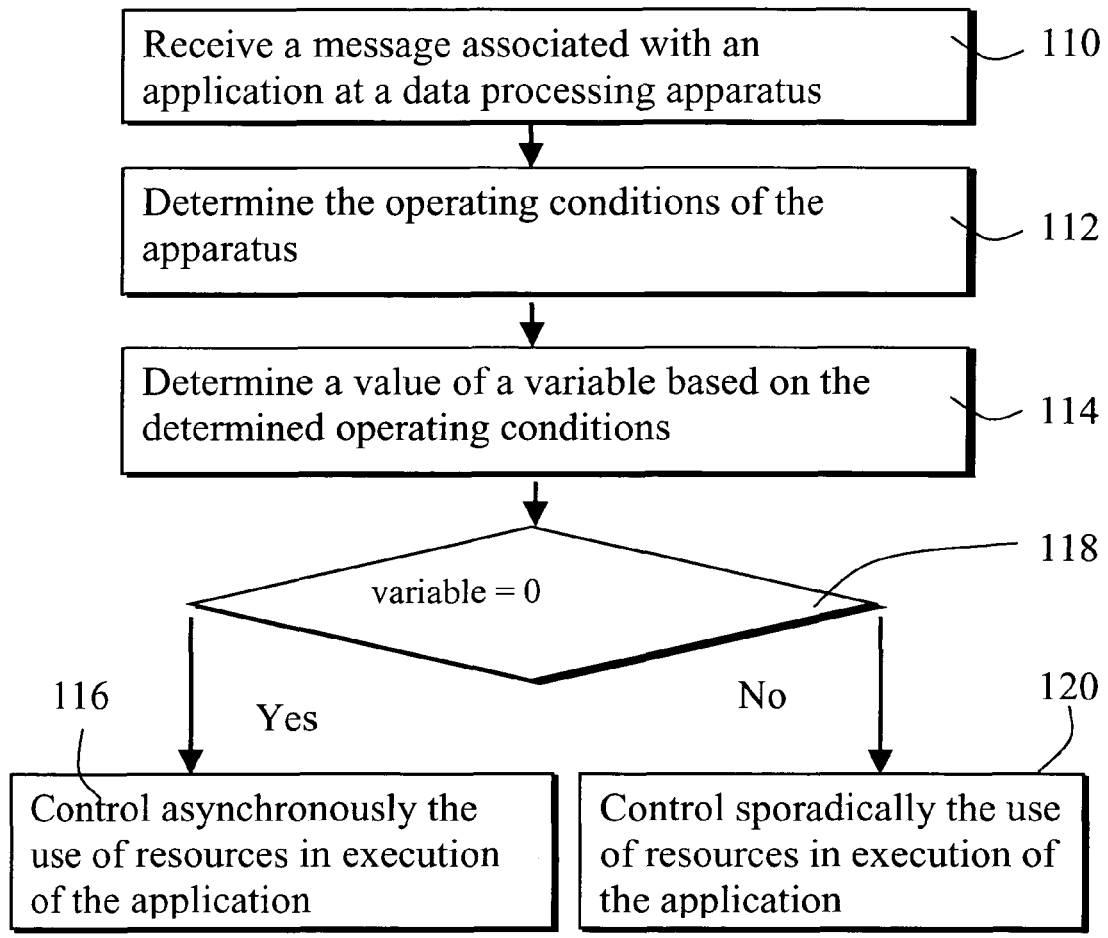
FIG. 5 shows a flowchart in accordance with another embodiment.

FIG. 5 illustrates this type of transfer between the modes based on the variable. In this embodiment asynchronous and sporadic handling are dynamically combined in the handling of burst-like traffic in a time critical communication environment. As above, a message is received at 110 and predefined operating conditions are determined at 112. A value of a variable is then determined at 114. With reference to the examples above, if the value of the delay parameter is 0 at 116, asynchronous handling of the message follows at 118. If the value of the delay parameter deviates from 0, the apparatus is handles the message sporadically at 120. In the sporadic handling the delay is used to ensure that the message is properly handled before execution of any further messages is initiated.

The state of asynchronous behaviour can in this example be understood as being a special case of sporadic behaviour. There is not necessarily any strict selection or switching between asynchronous and sporadic states, and there is no clear threshold for switching between the states. Instead every case is treated in a dynamic sporadic way with the knowledge that in certain condition the sporadic behaviour will be asynchronous.

The transfer between the asynchronous and the sporadic operational states may be continuous and the mode may be changed at any time. That enables operation where the handling of a message may be returned to asynchronous mode even before the handling is finished if it is detected that the operating conditions improve while the message is being handled.

A transfer between the two modes may happen immediately when the minimum time interval is set to be above zero. The difference between asynchronous and sporadic operations, if the delay is relatively small, for example 1 ms, may not be that dramatic. A threshold for the variable may be defined under which the system would operate in a completely asynchronous manner. When the threshold is exceeded, the increase in the wait time may be raised clearly. The increase in the delay may even be exponential above the threshold.

This type of embodiments may be particularly suited for applications with relatively tight response latency requirements. The asynchronous handling mode is preferably used for light loads when the system has free resources and each message can thus be processed right away. When the load increases, the behaviour is turned into what is more like the sporadic mode. Dynamic transfer of the operation between the modes in response to determined operating conditions assists in reducing response latency in a time critical system. The latencies may be controlled by better "pipelining" of the execution of applications in application servers. Dynamic switching between the mode may also allow a more optimized operation than what be obtained by basing the operation in a single resource allocation model. This may be especially the case where application servers are experiencing occasional bursty traffic.

Figure 6:
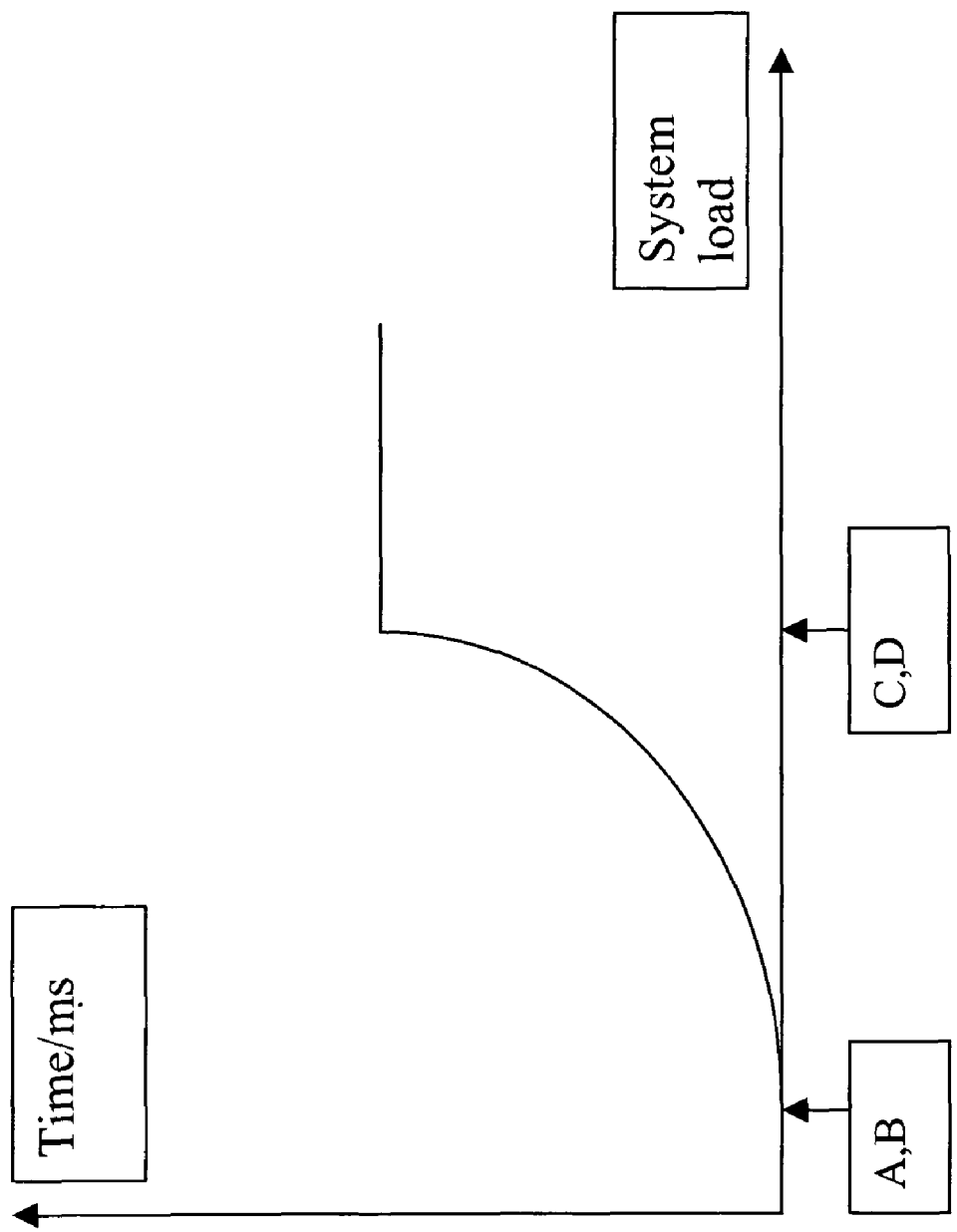
FIG. 6 shows a diagram for an exemplifying variable in accordance with an embodiment.

Different applications may require different functions for defining the variable to be used. For example, instead of being a linear function as shown in FIG. 4, the function can also be polynomial, exponential or pretty much anything. An example of a polynomial function is shown in FIG. 6, where delay is B until the system load reaches A (a totally asynchronous state). The delay then grows exponentially to D until the system load is C. After that point the delay is kept constant. In terms of a mathematical function this can be expressed as:

$$F(x)=B|x<=A$$

$$F(x)=z*((x-A)^2)+B|A<x<C, z=(D-B)/(C-A)^2$$

$$F(x)=D|x<=C.$$

This kind of system responds quickly to any increase in load after the set threshold A but has maximum limit of delay (D) after a certain load (C).

The delay determination may be based on any other appropriate scheme as well. For example, the determination may be based on a programmed heuristic function that cannot be described as a mathematic expression. A self-learning system may be used so that the application server can learn how to deal with traffic. For example:

If (CPUusage( )<50%)AND(FreeMemory( )>10 MB)
    delay=0;

Else delay=CPUusage( )*AverageThreadExecution-
    Time( ).

More complex principles for load determination may also be provided. For example, a low priority thread polling may be used for certain resources to see how busy these resources are. The more often a low priority thread can poll, the less stressed the system can be considered to be, and thus the delay can be lowered. This is because very low priority thread gets run only when system has nothing else to do. This kind of solution may be used for example when a bottleneck is expected to be caused by a specific resource in the system that is not directly measurable in a value. An example of such a resource is the number of threads in use and amount of memory used in a given moment.

Figure 7:
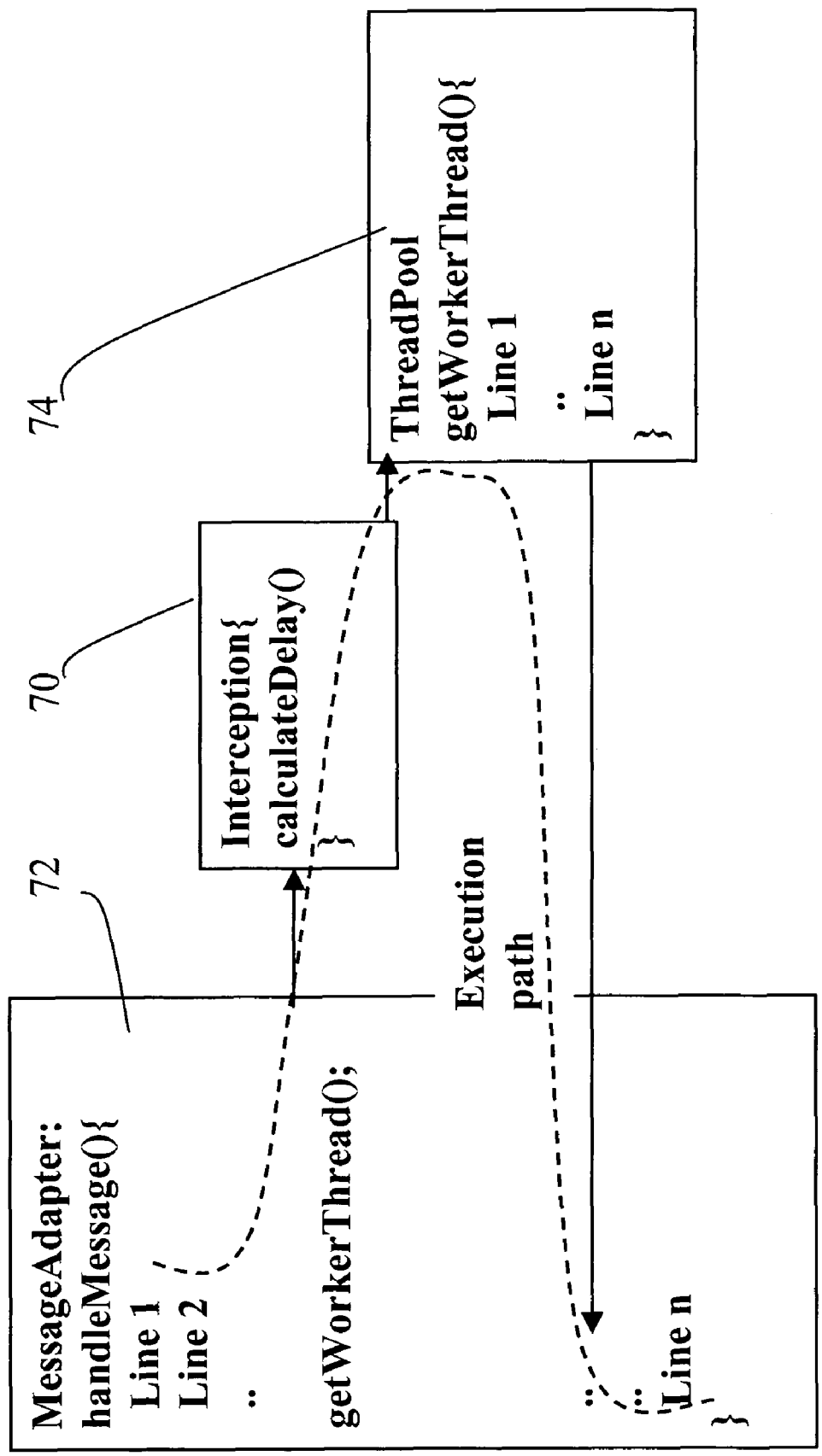
FIG. 7 shows a yet further embodiment.

In yet another embodiment shown in FIG. 7 burst protection is provided in a dynamic programming language environment by means of function interception. In FIG. 7 an interception function 70 is provided in an execution path between a message adapter 72 and a thread pool 74. Function, or method, interception is a concept introduced with the Aspect Oriented Programming model and it provides a way to intercept a function call. Intercepting can be understood as a procedure of interrupting a normal method call. In function interception, when a function is invoked, the control is passed to a defined interceptor along with the information regarding the function that was to be invoked. This interceptor can then find out the best possible or optimised delay based on resources usage. After blocking a specified time the control is released to the actual function to be invoked. A calling thread and the function called may not experience any difference but the interception allows a system to process some extra logic before the function call actually takes place.

Interception is a viable option if there is a reason for not to modify the thread pool. This may be so for example because of use of certain library routines. Also, interception allows providing the herein described burst protection principles without modifying existing software components.

In certain circumstances it may be advantageous to have as short minimum delay interval time as possible. However, due to reason such as, for example, system load and/or use of resources, a most minimum interval time cannot always be applied in all circumstances, and therefore unnecessarily high delay may be applied. This is a result of the common thinking that in typical application the expectation has been that the more load the system is undertaking the longer minimum interval time has to be used. A dynamically adjustable minimum interval time makes it possible to adjust the minimum interval time in an optimal manner. The adjustment can be based on various factors such as load, resource consumption and so on.

Also, it is possible to optimise the performance of a service providing system by adjusting the variable, for example a minimum interval time so that certain system parameters, for example throughput, resource consumption and so on, can be maintained within a desired range.

The embodiments may provide a mechanism that introduces a delay, when so required by the traffic conditions. The delay may be introduced by dynamically blocking a call or other event for a certain period of time. The embodiments may provide an optimal behaviour of data processing apparatus such as application servers in bursts. The method may allow an efficient tool for controlling which applications or requests are allocated execution time. The embodiments may also provide a mechanism that is relatively easy to implement, particularly since the implementation may be provided on the application level.

It is noted that while the above examples refer to certain technologies, this scheme is applicable to other languages and platforms as well. Non-limiting examples of these include also non-time critical applications.

The required data processing functions may be provided by means of one or more data processors provided in the data processing apparatus or elsewhere. The functions of FIGS. 2 and 7 may be provided in a single processor or in a plurality of processors. An appropriately adapted computer program code product or products may be used for implementing the embodiments, when loaded on an appropriate processor. The program code means may, for example, perform at least one of the task of detection of an event, for example reception of a message associated with an application, controlling allocation and use of resources in handling the response to the event based on a variable, controlling setting of the value of the variable, sending and receiving information, interpretation of information and so forth. The program code product for providing the operation may be stored on and provided by means of a carrier medium such as a carrier disc, card or tape. A possibility is to download the program code product to the mobile device via a data network.

It is noted that whilst embodiments have been described in relation to a data processing apparatus such as an application server responsive to requests, embodiments of the present invention are applicable to any apparatus wherein applications are executed in response to events and management of allocation and use of resources may be desired.

It is also noted that although certain embodiments were described above by way of example with reference to the exemplifying architectures of certain communication system, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention as defined in the appended claims.

We claim:

1. An apparatus comprising:
    at least one processor; and
    at least one memory including computer program code;

the at least one memory and the computer program code configured to, with the at least one processor, cause the apparatus at least to:

execute at least one application using at least one execution resource;

detect events triggering execution of the at least one application and dynamically control use of the at least one execution resource in handling of the detected events based on a variable delay, wherein the length of the delay is selected in dependence of at least one operating condition of the apparatus;

wherein the at least one processor is configured to cause the apparatus to prevent overloading of the apparatus by increasing the delay; and wherein the at least one processor is further configured to cause the apparatus to determine a value of the variable delay based on information about reserved resources.

2. The apparatus as claimed in claim 1, wherein the at least one processor is further configured to cause the apparatus to determine the value of the variable delay based on information of sporadic threads that are in use.

3. The apparatus as claimed in claim 1, wherein the at least one processor is further configured to cause the apparatus to determine the value of the variable delay based on a mathematical function.

4. The apparatus as claimed in claim 1, wherein the at least one processor is configured to cause the apparatus to determine a value of the variable delay based on information obtained by polling low priority threads.

5. The apparatus as claimed in claim 1, wherein the at least one processor is configured to cause the apparatus to transfer between different modes of operation by changing a value of the variable delay.

6. The apparatus as claimed in claim 1, wherein the apparatus is configured to be operated in an asynchronous mode or in a sporadic mode depending on a value of the variable delay.

7. The apparatus as claimed in claim 6, wherein the apparatus is configured to transfer to the sporadic mode in response to a load increase.

8. The apparatus as claimed in claim 1, wherein the at least one processor is configured to cause the apparatus to receive a value of the variable delay from another entity.

9. The apparatus as claimed in claim 8, wherein the at least one processor is configured to cause the apparatus to receive the value of the variable delay from a function interceptor.

10. The apparatus as claimed in claim 1, wherein the at least one processor is configured to cause the apparatus to adjust the variable delay such that the apparatus responds to an event with a smallest possible delay.

11. The apparatus as claimed in claim 1, wherein the at least one processor is configured to cause the apparatus to adjust the variable delay such that at least one system parameter is maintained within a desired range.

12. A method comprising, with use of a processor:

triggering execution of an application in an apparatus in response to an event;

dynamically controlling use of execution resources in handling of the event based on a variable delay, wherein the length of the delay is selected in dependence of at least one operating condition of the apparatus;

increasing the delay to prevent overloading of the apparatus; and determining a value of the variable delay based on information about reserved resources.

13. The method as claimed in claim 12, further comprising determining the value of the variable delay based on information of sporadic threads that are already in use.

14. The method as claimed in claim 12, comprising changing a value of the variable delay in response to a change in the at least one operating condition.

15. The method as claimed in claim 12, comprising operating the apparatus asynchronously or sporadically depending on a value of the variable delay.

16. The method as claimed in claim 15, comprising transferring to sporadic operation in response to a detected load increase.

17. The method as claimed in claim 12, comprising adjusting the variable delay such that the apparatus responds to an event with a smallest possible delay.

18. The method as claimed in claim 12, comprising maintaining at least one system parameter within a desired range by adjusting the variable delay.

19. A computer program embodied on a non-transitory computer-readable medium, the computer program configured to, with at least one processor and at least one memory cause an apparatus to:

dynamically control use of execution resources in handling of events in the apparatus for executing applications based on a variable delay, wherein the length of the delay is selected in dependence of at least one operating condition of the apparatus;

increase the delay to prevent overloading of the apparatus; and determine a value of the variable delay based on information about reserved resources.

20. A computer program as claimed in claim 19, the computer program configured to, with the least one processor and the at least one memory cause the apparatus to control an application server.

21. An apparatus comprising:

at least one processor; and at least one memory including computer program code;

the at least one memory and the computer program code configured to, with the at least one processor, cause the apparatus at least to:

execute at least one application;

detect events triggering execution of the at least one application and dynamically control use of at least one execution resource in handling of the detected events based on a variable delay, wherein the length of the delay is selected in dependence of at least one operating condition of the apparatus; the at least one memory and the computer program code further configured to, with the at least one processor, cause the apparatus at least to increase the delay to prevent overloading of the apparatus; and to determine a value of the variable delay based on information about reserved resources.

* * * * *